United States Patent
Rohrbach et al.

(10) Patent No.: US 7,291,264 B2
(45) Date of Patent: *Nov. 6, 2007

(54) STAGED OIL FILTER INCORPORATING ADDITIVE-RELEASING PARTICLES

(75) Inventors: Ronald Paul Rohrbach, Flemington, NJ (US); Gordon William Jones, Toledo, OH (US); Peter D. Unger, Morristown, NJ (US); Daniel E. Bause, Flanders, NJ (US)

(73) Assignee: Honeywell International, Inc., Morristown, NJ (US)

( * ) Notice: Subject to any disclaimer, the term of this patent is extended or adjusted under 35 U.S.C. 154(b) by 63 days.

This patent is subject to a terminal disclaimer.

(21) Appl. No.: 09/867,973

(22) Filed: May 30, 2001

(65) Prior Publication Data

US 2002/0014447 A1 Feb. 7, 2002

Related U.S. Application Data (63) Continuation-in-part of application No. 09/566,034, filed on May 8, 2000, now abandoned, and a continuation-in-part of application No. 09/566,035, filed on May 8, 2000, now Pat. No. 6,379,564.

(51) Int. Cl.
*B01D 27/14* (2006.01)
(52) U.S. Cl. .................. 210/209; 210/266; 210/282; 210/287; 210/416.5; 210/DIG. 17
(58) Field of Classification Search ............. 210/206, 210/266, 282, 287, 416.5, DIG. 17, 209
See application file for complete search history.

(56) References Cited

U.S. PATENT DOCUMENTS

| | | | |
|---|---|---|---|
| 2,310,305 A | 12/1937 | Miller et al. | 123/196 A |
| 2,262,526 A | 7/1938 | Fairlie et al. | 123/196 A |
| 3,336,223 A | 8/1967 | Kneeland | 508/287 |
| 4,075,097 A | 2/1978 | Paul | 210/168 |
| 4,075,098 A | 2/1978 | Paul et al. | 210/168 |
| 4,144,166 A | 3/1979 | DeJovine | 508/117 |
| 4,144,169 A | 3/1979 | Grueschow | 210/168 |
| 4,265,748 A | 5/1981 | Villani et al. | 210/132 |
| 4,557,829 A | 12/1985 | Fields | 210/132 |
| 4,660,645 A | 4/1987 | Newlove et al. | 166/304 |
| 4,751,901 A | 6/1988 | Moor | 123/196 A |
| 4,755,289 A | 7/1988 | Villani | 210/632 |

(Continued)

FOREIGN PATENT DOCUMENTS

EP 0416905 A2 3/1991

(Continued)

*Primary Examiner*—Peter A. Hruskoci (57) ABSTRACT

An improved oil conditioning filter, for use with an internal combustion engine, includes a mechanically active filter element and a chemically active filter element containing a beneficial additive therein. The beneficial additive is provided to extend the useful life of lubricating oil in an internal combustion engine. The beneficial additive may include an antioxidant, an anti-wear agent, and/or a basic salt. In a preferred embodiment of the invention, the chemically active conditioning agent is provided in a plurality of particles disposed within the oil filter housing. The particles may be bonded together to form an integral porous filter element having spaces defined between the particles thereof. The particles are made either by a hot extrusion process or by a solvent process.

12 Claims, 6 Drawing Sheets

U.S. PATENT DOCUMENTS

| | | | |
|---|---|---|---|
| 4,886,599 A | 12/1989 | Bachmann et al. | 210/287 |
| 4,888,122 A | 12/1989 | McCready | 252/25 |
| 4,906,389 A | 3/1990 | Brownawell et al. | 252/25 |
| 5,032,259 A | 7/1991 | He et al. | 210/133 |
| 5,042,617 A | 8/1991 | Brownawell et al. | 184/6.24 |
| 5,057,368 A | 10/1991 | Largman et al. | 428/397 |
| 5,069,799 A | 12/1991 | Brownawell et al. | 210/749 |
| 5,069,970 A | 12/1991 | Largman et al. | 428/373 |
| 5,209,842 A | 5/1993 | Moor | 210/168 |
| 5,225,081 A | 7/1993 | Brownawell | 210/690 |
| 5,478,463 A | 12/1995 | Brownawell et al. | 208/180 |
| 5,527,452 A | 6/1996 | Grigoriev et al. | 210/130 |
| 5,544,699 A * | 8/1996 | Robers et al. | 165/283 |
| 5,552,040 A | 9/1996 | Baehler et al. | 210/168 |
| 5,591,330 A | 1/1997 | Lefebvre | 210/203 |
| 5,713,971 A | 2/1998 | Rohrbach et al. | 55/233 |
| 5,718,258 A | 2/1998 | Lefebvre et al. | 137/268 |
| 5,725,031 A * | 3/1998 | Bilski et al. | 210/DIG. 17 |
| 5,741,433 A | 4/1998 | Mitchell et al. | 252/74 |
| 5,759,394 A | 6/1998 | Rohrbach et al. | 210/264 |
| 5,772,873 A | 6/1998 | Hudgens et al. | 210/192 |
| 5,902,384 A | 5/1999 | Rohrbach et al. | 96/296 |
| 5,948,248 A * | 9/1999 | Brown | 210/206 |
| 6,045,692 A | 4/2000 | Bilski et al. | 210/198.1 |
| 6,126,823 A | 10/2000 | Soderlund et al. | 210/206 |
| 6,238,554 B1 * | 5/2001 | Martin et al. | 210/109 |
| RE37,369 E | 9/2001 | Hudgens et al. | 210/192 |
| 6,379,564 B1 * | 4/2002 | Rohrbach et al. | 210/765 |

FOREIGN PATENT DOCUMENTS

| | | |
|---|---|---|
| EP | 0416908 A2 | 3/1991 |
| EP | 078237 A1 | 4/1996 |
| EP | 1061251 A2 | 12/2000 |
| FR | 2330856 | 6/1977 |
| SU | 1776423 A | 11/1992 |
| WO | WO 94/11556 | 5/1994 |
| WO | WO 01/85300 A2 | 11/2001 |
| WO | WO 02/96534 A1 | 5/2002 |

\* cited by examiner

STAGED OIL FILTER INCORPORATING ADDITIVE-RELEASING PARTICLES

CROSS-REFERENCE TO RELATED APPLICATIONS

This is a continuation-in-part of U.S. patent application Ser. No. 09/566,034, filed May 8, 2000 now abandoned, the disclosure of which is incorporated by reference herein, and of U.S. patent application Ser. No. 09/566,035, filed May 8, 2000 now U.S. Pat. No. 6,379,564, the disclosure which is also incorporated by reference herein.

BACKGROUND OF THE INVENTION

1. Field of the invention

The present invention relates to an oil filter apparatus for use in conjunction with an internal combustion engine. More particularly, the present invention relates to an oil filter apparatus including both a mechanically active filter element and a chemically active filter element incorporated therein. Even more particularly, the present invention relates to an oil filter of the type described, in which the chemically active filter element includes a plurality of particles including one or more oil-extending additives, for prolonging the useful life of engine oil. Preferably, the particles include an anti-oxidant and/or and anti-wear agent.

2. Description of the Background Art

Many different types of fluid filters are known. Most such filters use a mechanical or 'screening' type of filtration, with a replaceable cartridge having a porous filter element therein.

In the oil filtration art, it is well known that normal operation of an internal combustion engine, particularly a diesel engine, results in the formation of contaminants. These contaminants include, among others, soot, which is formed from incomplete combustion of the fossil fuel, and acids that result from combustion. Both of these contaminants are typically introduced into the lubricating oil during engine operation, and tend to increase oil viscosity and to generate unwanted engine deposits, leading to increased engine wear.

The conventional solution to these problems has been to place various additives into lubricating oils. In order to combat soot-related problems, many conventional lubricating oils include dispersants that resist agglomeration of soot therein. These work well for a short period, but may become depleted. Additionally, due to the solubility and chemical stability limits of these dispersants in the oil, the service lives of the lubricating oil and the oil filter are less than optimal.

For combating combustion acid related problems, many conventional systems include neutralizing additives known as over-based detergents. These are a source of TBN (total base number), which is a measure of the quantity of the over-based detergent in the oil. The depletion of the TBN is an important limiting factor for many internal combustion engines, and in particular for heavy-duty applications with diesel engines.

In order to improve engine protection and to combat other problems, conventional lubricating oils often include one or more further additives, which may be corrosion inhibitors, antioxidants, friction modifiers, pour point depressants, detergents, viscosity index improvers, anti-wear agents, and/or extreme pressure additives. The inclusion of these further additives may be beneficial; however, with conventional methods, the amount and concentration of these additives are limited by the ability of lubricating oils to suspend these additives, as well as by the chemical stability of these additives in the oil.

A number of oil filters containing oil-improving additives are known. The known oil filters of this type are primarily adapted to slowly release the additives over time, as hot oil is circulated through the filter. Examples of some of these types of oil filters include U.S. Pat No. 4,075,097 to Paul, U.S. Pat. No. 4,144,166 to De Jovine, U.S. Pat. No. 4,144,169 to Grueschow, U.S. Pat. No. 4,265,748 to Villani et al, U.S. Pat. No. 4,755,289 to Villani, and U.S. Pat. No. 5,591,330 to Lefebvre.

Other solutions have been proposed in addition to the conventional method of mixing additives with lubricating oil. For example, in order to combat the build up of sludge in oil, U.S. Pat. No. 5,478,463, issued in 1995 to Brownawell et al, and entitled Method of Reducing Sludge and Varnish Precursors in Lubricating Oil; and U.S. Pat. No. 5,042,617, issued in 1991 to Brownawell, and entitled Method of Reducing the Presence of Sludge in Lubricating Oils, each disclose an oil filter and method for reducing the amount of sludge in lubricating oil as it circulates throughout an engine. These Brownawell patents provide for the inclusion of particles in an oil filter that are oil insoluble and oil wettable, and which complex with sludge such that at least some of the sludge that these particles come into contact with is immobilized on the particles. The Brownawell '617 patent discloses the inclusion of oil insoluble and oil wettable particles in an oil filter that are retained on a particleized substrate, whereas the Brownawell '463 patent discloses the inclusion of such particles that are not retained on a substrate, but are nonetheless retained in the oil filter.

Another Brownawell patent, which relates to the reduction of combustion acids in lubricating oil, is U.S. Pat. No. 5,069,799 issued in 1991 and entitled Method For Rejuvenating Lubricating Oils. This Brownawell patent discloses an oil filter and method for reducing the amount of combustion acids in lubricating oil. In particular, it discloses a method of rejuvenating lubricating oil, which includes reduction of combustion acids, by serially passing the oil through first a chemically active filter media, then a physically active filter media, and finally an inactive filter media. In this '799 patent, the chemically active filter media includes a strong base, to displace weak bases that have combined with combustion acids. The combustion acid and the strong base then combine to form a salt, which is then physically trapped by subsequent mechanical filter media.

U.S. Pat. No. 5,225,081 to Brownawell discloses method of removing polynuclear aromatics from used lubricating oil. The method of the Brownawell '081 reference involves passing oil through a staged oil filter system, which may include a chemically active filter media. The chemically active filter media is made of a composite material including particles of an active component and a and a thermoplastic binder, which are a product of a heated extrusion process. Beneficial additives are given as one example of materials suitable for use as materials usable as chemically active filter media. Activated carbon is also emphasized as a preferred component of the filter media.

Some designs for multiple stage oil filters are known, such as those disclosed in U.S. Pat. Nos. 4,557,829 and 4,886,599. U.S. Pat. No. 4,886,599 to Bachmann et al. discloses a filter cartridge with sequential concentric cylindrical filter elements, for both chemical and mechanical filtration of oil contained in an oil-sealed vacuum pump.

Other designs for oil filters that contain extra additives and dispense those additives into oil, over time, are disclosed in U.S. Pat. Nos. 4,075,098 and 5,552,040.

A need still exists in the art for an improved oil filter having one or more beneficial additives incorporated therein to counteract the effects of oil aging. A need also exists for an improved oil filter which could extend the useful life of engine oil, so as to allow a user to extend the time interval between oil changes in a vehicle.

SUMMARY OF THE INVENTION

The present invention provides an improved oil filter having a beneficial additive incorporated therein. The beneficial additive is provided to counteract the effects of oil aging. In a preferred embodiment of the invention, the beneficial additive is provided in the form of a plurality of particles disposed within the oil filter housing.

In a particular embodiment of the invention, these particles are a product of a process in which a finely divided thermoplastic binder is mixed with a granular or particulate form of a beneficial additive, in the presence of an organic solvent. After thorough mixing, the mixture is formed into particles, and then the solvent is evaporated from the particles.

It is an advantage of the present invention that by forming the particles by the above-described process, a high percentage of the beneficial additive in the particle may be achieved.

Accordingly, it is an object of the present invention to provide an improved oil filter including a plurality of particles, wherein the particles contain one or more beneficial additives.

It is a further object of the present invention to provide a method of making an improved oil filter of the type described.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF THE PREFERRED EMBODIMENT

Throughout the present specification, relative positional terms like 'upper', 'lower', 'top', 'bottom', 'horizontal', 'vertical', and the like are used to refer to the orientation of the filters shown in the drawings. These terms are used in an illustrative sense to describe the depicted embodiments, and are not meant to be limitative. It will be understood that in a specific application thereof, a filter may be installed on an engine in an orientation different from that shown in the drawings, such as inverted 180 degrees or transverse to that shown, and in such a case, the above-identified relative positional terms will no longer be accurate.

Figure 1:
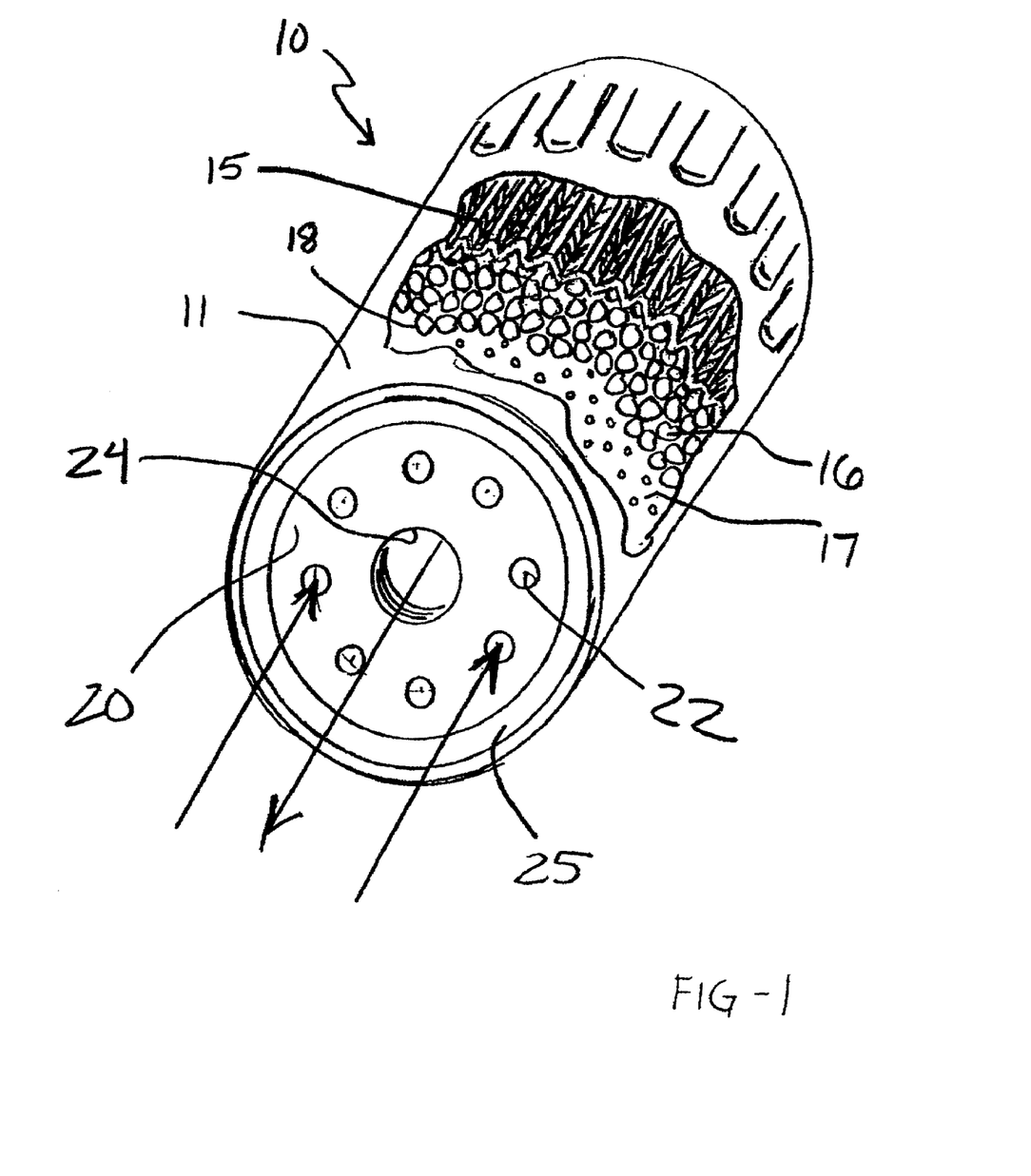
FIG. 1 is a perspective view, partially cut away, of an oil filter in accordance with a first embodiment of the present invention.
Figures 2, 7:
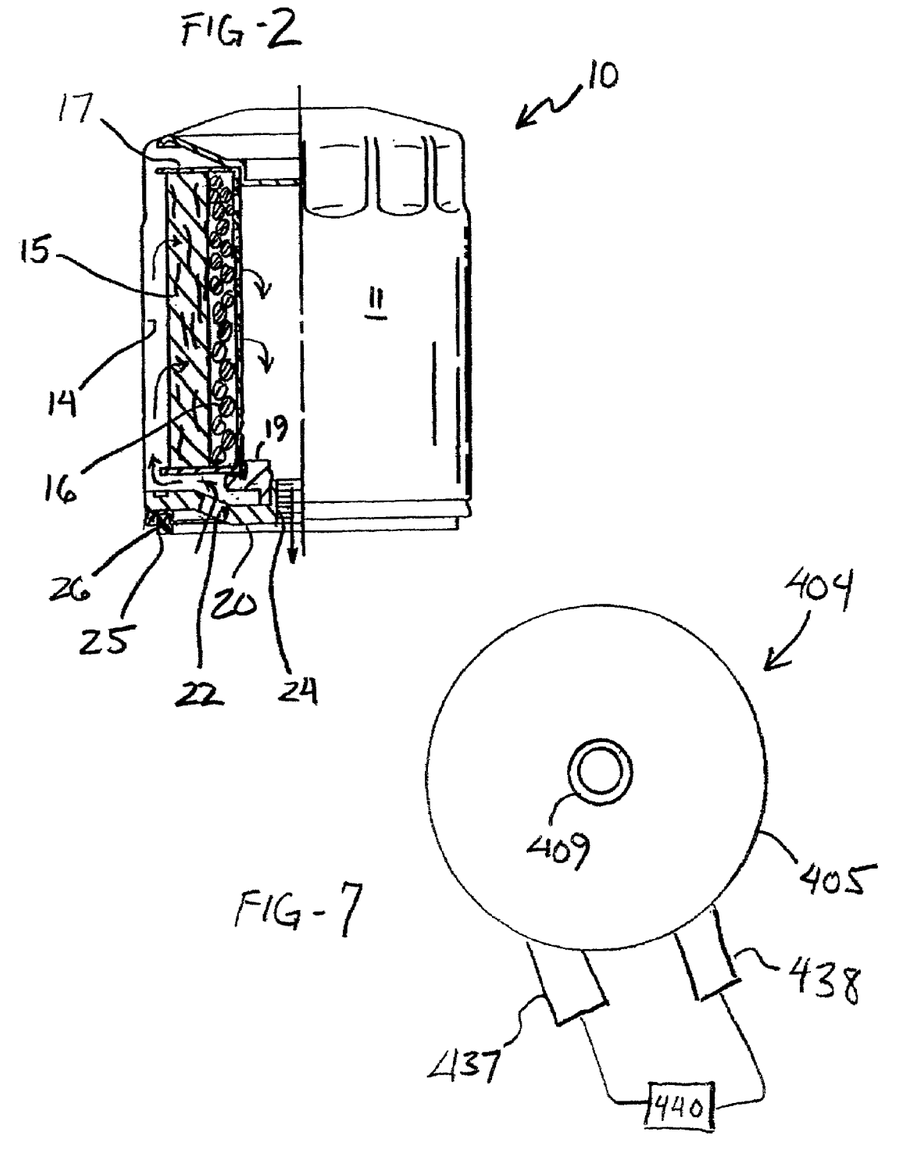
FIG. 2 is a cross-sectional view of the filter of FIG. 1.
FIG. 7 is a top plan view of a supplemental cartridge, which is a component of the assembly of FIG. 6.

Referring to FIGS. 1 and 2, there is shown an oil filter 10 according to a first preferred embodiment of this invention. The direction of oil flow, through the filter 10, is shown by the arrows in FIG. 2, which illustrate a flow path through the filter.

The oil filter 10 generally includes a hollow cylindrical housing 11 which defines a chamber 14 therein, a porous mechanically active filter element 15 within that chamber, and a chemically active filter element 16, made up of a plurality of individual composite particles 18, also retained within the chamber inside the housing. A foraminous cylindrical screen or support frame 17 may, optionally, be provided within the housing 11 to supportively hold the filter elements 15, 16 therein. A grommet 19 or other internal sealing member is provided centrally at the base of the frame 17 to route the oil along the flow path and through the filter elements 15, 16. The grommet 19 may include a flexibly resilient sealing member having an integral pressure relief valve therein, such as that disclosed in co-pending U.S. patent application Ser. no. 09/271,137, filed Mar. 17, 1999, the disclosure of which is incorporated by reference. Alternatively, the oil filter 10 may incorporate a spring-loaded or other conventional pressure relief valve of a type known to those in the art.

A base plate, or tapping plate 20 of the housing 11 includes a plurality of inlet ports 22 formed therethrough and arranged in a circular pattern. The tapping plate 20 also includes a central outlet port 24. The outlet port 24 has a plurality of female threads formed therein to allow rotatable mounting of the filter 10 on an externally threaded hollow tubular fitting on an engine block (not shown). An annular external sealing member 25 fits engagingly into a groove 26 formed at the bottom surface of the tapping plate, to resist oil leakage outwardly from the base of the filter.

In the depicted embodiment 10 of FIGS. 1-2, the mechanically active filter element 15 is a conventional cylindrical member made of accordion-pleated filter paper.

The chemically active filter element 16 is also provided in the shape of a cylinder in this embodiment, and is disposed radially and coaxially within the mechanical filter element 15.

In this first embodiment 10 the chemically active filter element 16 is located inside of, and therefore downstream of the mechanical filter element 15, in order to allow a first mechanical filtration to take place before the chemical reaction of unwanted contaminants from the oil with the beneficial additive of the chemical filter element 16.

Placement of the chemical filter element 16 between the mechanically active filter element 15 and the frame member 17, as shown in the first filter embodiment 10, puts it downstream form the mechanical filter element, yet still obtains the maximum possible support from the frame member 17. This may be helpful where the chemical filter element 16 is made up of a plurality of separate and unconnected individual particles 18. Alternatively, the individual particles 18 making up the chemically active filter element 16 may be bonded together or otherwise cohesively associated with one another to form a substantially integral, yet highly porous filter element 16 capable of independently supporting itself.

The particles 18 making up the chemically active filter element 16 are an important feature of the filter 10 hereof. The particles may be granules, pellets, elongated strands, or may be irregularly and randomly-shaped particles.

The particles are preferably made with a diameter in a range of 0.1 to 6 millimeters, preferably in a range of 0.25 to 5 millimeters in order to control the intersticial spaces therebetween in the filter matrix. The size of these interstices is specifically chosen and engineered to screen out most complexes which result from a reaction between combustion acids in the filtered oil and the beneficial additive of the particles, without substantially reducing the flow rate through the chemically active filter member 16.

The particles are made primarily of a beneficial additive which may be compressed without any binder. Alternatively, the particles may be held together with a polymeric, starch or other suitable binder. Optionally, the particles may be made exclusively of beneficial additive and binder, in order to maximize the level of active ingredient therein. The beneficial additive of the particles may include a basic salt selected from the group consisting of calcium carbonate, potassium carbonate, potassium bicarbonate, aluminum dihydroxy sodium carbonate, magnesium oxide, magnesium carbonate, zinc oxide, sodium bicarbonate, sodium hydroxide, calcium hydroxide, potassium hydroxide, and mixtures thereof.

Other preferred additives which may be included as part of the binder composition include antioxidants and anti-wear agents.

Where used, suitable antioxidants may be selected from the group consisting of imidazoline-phosphonate salts, substituted triazoles, sulfurized carboxylates, phenolic compounds, arylamino compounds, substituted thiazoles, substituted thiadiazoles, phosphosulfurized olefins, zinc dithiophosphates, and zinc dialkyldithiophosphates, aromatic sulfides, aromatic polysulfides, alkyl sulfides, alkyl polysulfides, sulfurized olefins, sulfurized carboxylic acid esters, and sulfurized ester-olefins, and mixtures thereof.

Other materials may be added to the particles if desired.

Figure 3:
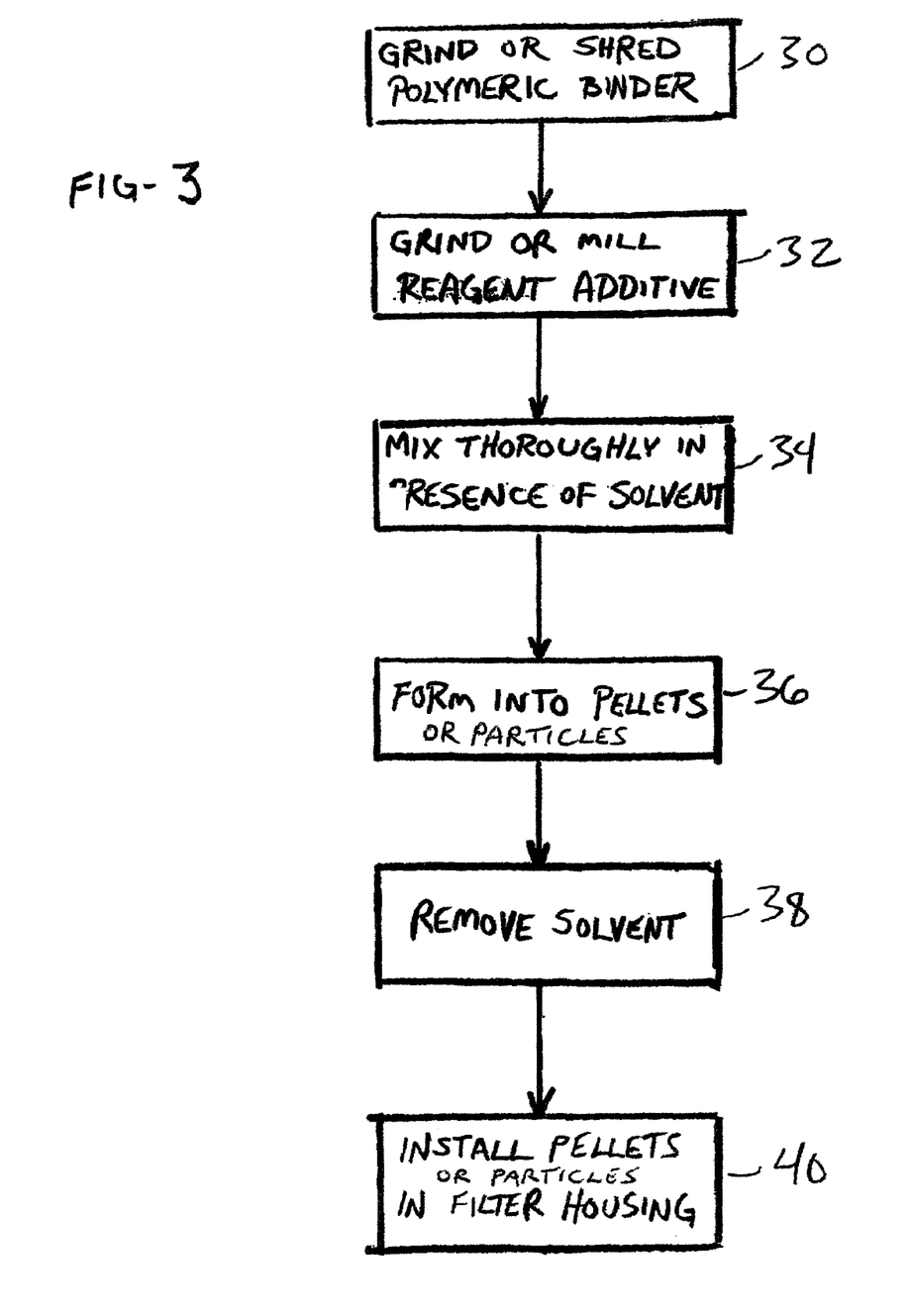
FIG. 3 is a flow chart showing a series of steps in a preferred method of forming an oil filter according to the invention.

Referring now to FIG. 3, a series of steps in a first method of making a filter 10 are shown. An early step 30 in the first method hereof is to grind or shred a polymeric binder, if comminution of the binder is needed, so that it is present in a finely divided form.

Preferred binders in the practice of the present invention are thermoplastics. Particularly preferred binders include polyamides, polyimides, polyesters, polyolefins, polysulfones, and mixtures thereof. If the binder may be obtained in pulverized or granular form, the step 30 of grinding or shredding the binder may be omitted.

Another early step 32 in the first preferred method hereof is to grind or mill the beneficial additive for the particles, if it is not already provided in particulate form. This step is optional, and where it is necessary, steps 30 and 32 may be performed in any order.

As noted, materials usable for the basic component, in accordance with the invention, include basic salts selected from the group consisting of calcium carbonate, potassium carbonate, potassium bicarbonate, aluminum dihydroxy sodium carbonate, magnesium oxide, magnesium carbonate, zinc oxide, sodium bicarbonate, sodium hydroxide, calcium hydroxide, and mixtures thereof.

Other suitable additives may include one or more antioxidants selected from the group consisting of imidazoline-phosphonate salts, substituted triazoles, sulfurized carboxylates, phenolic compounds, arylamino compounds, substituted thiazoles, substituted thiadiazoles, phosphosulfurized olefins, zinc dithiophosphates, and zinc dialkyldithiophosphates, aromatic sulfides, aromatic polysulfides, alkyl sulfides, alkyl polysulfides, sulfurized olefins, sulfurized carboxylic acid esters, and sulfurized ester-olefins, and mixtures thereof.

Once the beneficial additive and the binder are both present in finely divided form, they must be thoroughly mixed, in the presence of a suitable solvent, during a mixing step 34. This is done by mixing the binder into the liquid solvent, stirring, and then subsequently adding the powdered or granular base. The binder is preferred to be present in a range of 3-20 percent of the solids present, and the beneficial additive is preferred to be present in a range of 90-97 percent of the solids.

Suitable solvents, which may be used in the practice of the present invention, include organic solvents, particularly volatile organic solvents. A minimum amount of solvent which will allow for complete mixing of the solids is preferred.

After mixing is complete, the mixture is formed into particles in the next step 36. This may be done by cold extrusion or by any other suitable means known to those in the art.

Once the particles 18 are formed, the solvent is removed therefrom by evaporation in a drying step 38, and when the particles are dry, they are installed into the filter housing 11 in a filter assembly step 40.

Using the above-identified solvent-based first preferred method of forming the particles according to the invention allows for up to 90-97 percent basic salt, by weight, being present in the finished particles. This is a higher concentration of the active salt in the particles than is possible with a particle forming operation in which a heated mixture is extruded from a die to form a particle. Typically using the heated extrusion method only allows for a maximum of 50-80 percent active salt, with the balance being the binder.

As previously noted, if desired, the particles may be bonded together or otherwise connected together to form a substantially integral, yet perforated and highly porous chemical filter element 16. Where the particles 18 are joined together in this way, the frame member 17 is not needed, and may be omitted if desired.

During use, hot oil slowly flows past the beneficial additive in the chemically active filter element, and the beneficial additive is slowly released over the useful life of the filter. This, in turn, allows for greater intervals between oil changes than is possible without the chemically active filter element.

Figure 4:
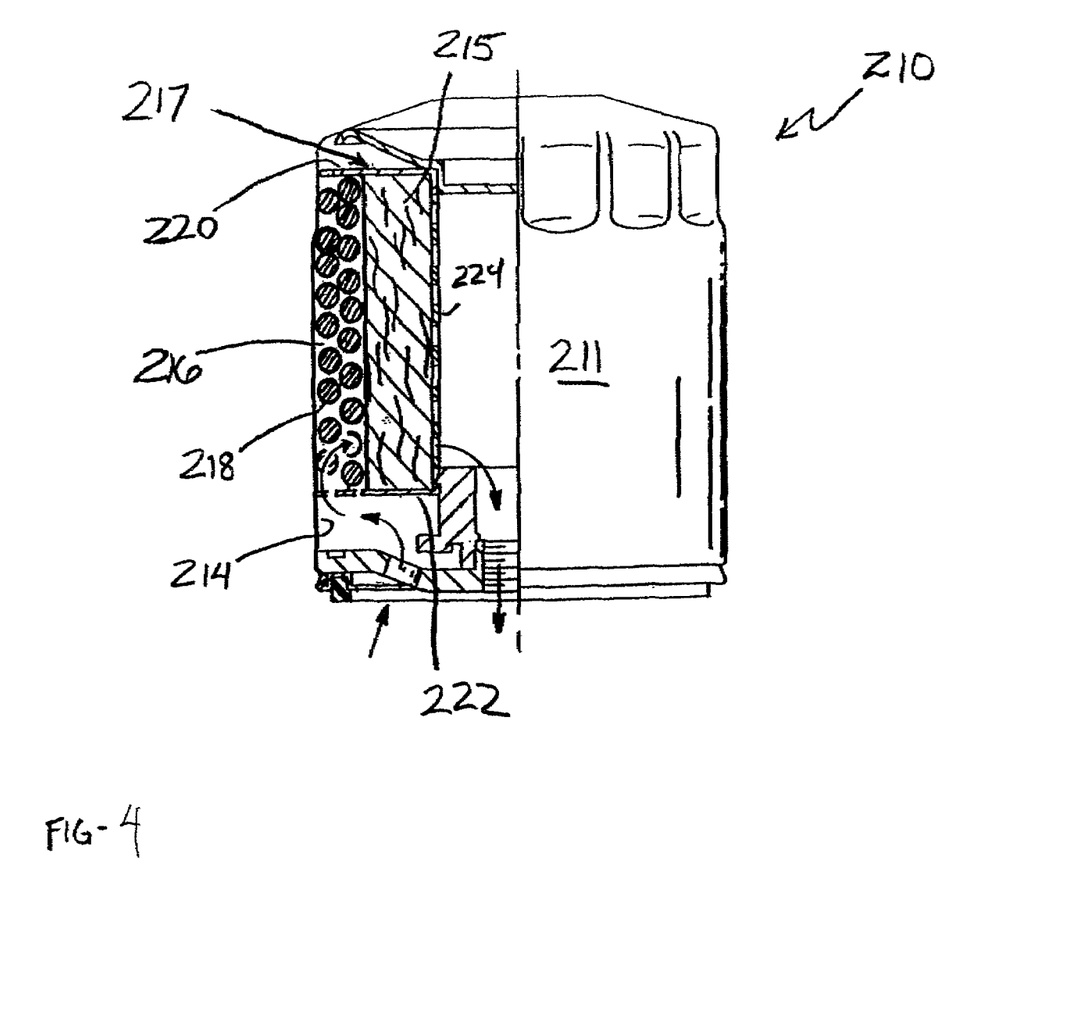
FIG. 4 is a cross-sectional view of an oil filter according to a second embodiment of the present invention.

Referring now to FIG. 4, a cross-section of an oil filter 210 in connection with a second embodiment is shown. The oil filter 210 in this embodiment generally includes a cylindrical housing 211 which defines a hollow space 214 therein, a porous mechanically active filter element 215 within that space, and a chemically active filter element 216, made up of a plurality of individual composite particles 218, also retained within the hollow space inside the housing and disposed within the mechanically active filter element. As noted in connection with the first embodiment 10, the individual particles 218 making up the chemically active filter element 216 may be bonded together or otherwise cohesively associated with one another to form a substantially integral, yet highly porous filter element 216 capable of independently supporting itself. With the exception of the configuration and placement of the respective mechanical and chemical filter elements 215, 216 as specified in this section, the oil filter 210 is substantially identical to the oil filter 10 of the first embodiment, as described hereinabove.

In the embodiment 210 of FIG. 4, the mechanically active filter element 215 is a conventional cylindrical member made of accordion-pleated filter paper.

The chemically active filter element 216 is also provided in the shape of a cylinder in this embodiment, and is disposed radially and coaxially outside of the mechanically active filter element 215. A foraminous cylindrical screen or support frame 217 may, optionally, be provided within the housing 211 to supportively hold the filter elements 215, 216 therein. In this second embodiment 210 the chemically active filter element 216 is located outside of, and therefore upstream of the mechanical filter element 215, in order to allow chemical modification of acids or other unwanted contaminants which may be present in the oil, with the beneficial additive of the chemical filter element 216, prior to mechanical filtration. In this second embodiment 210, the top and bottom horizontal segments 220, 222 of the frame member 217 have been extended outwardly towards the outer wall of the 219 of the housing 211, as compared to the frame member 17 from the first embodiment, to contain the particles 218 of the chemically active filter element therebetween. However, the portion of the frame member bottom horizontal segment 222 below the chemical filter element 216 is made foraminous, as shown, to allow oil to flow freely therethrough. The vertical inner wall 224 of the frame member 217 is also necessarily foraminous to allow oil flow therethrough.

Figure 5:
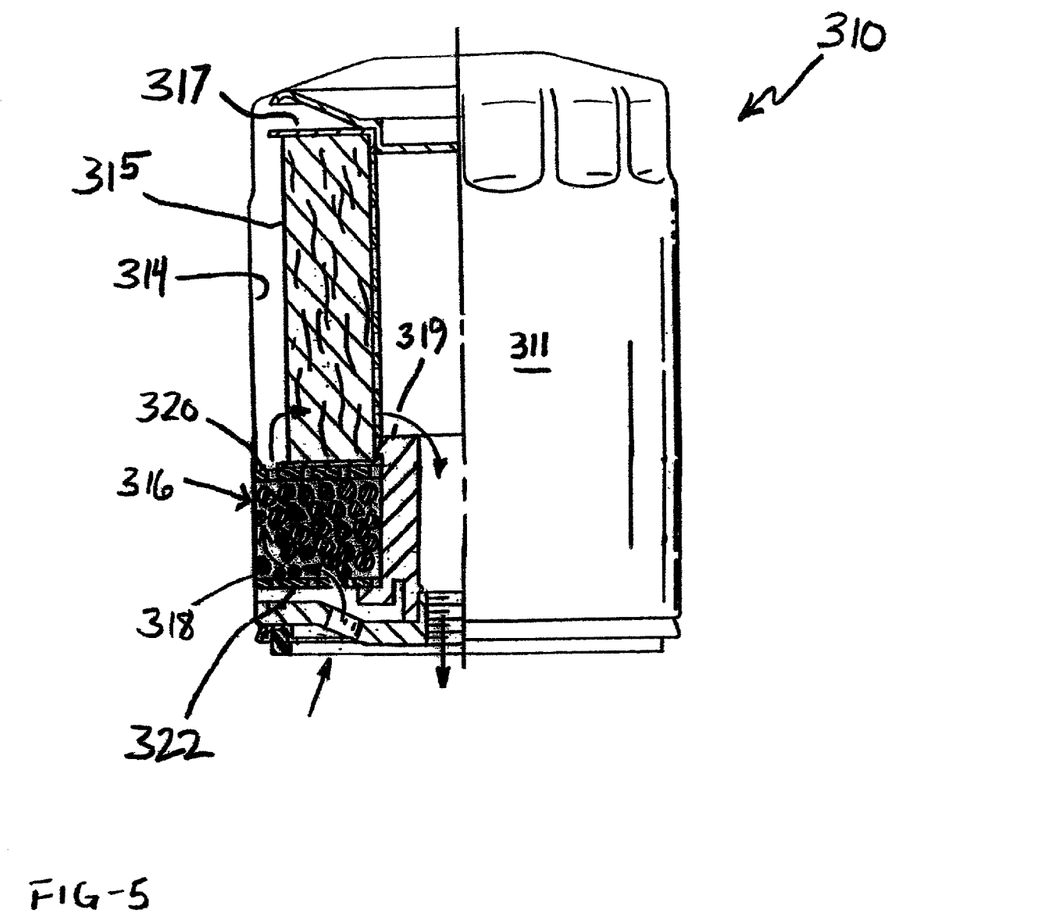
FIG. 5 is a cross-sectional view of an oil filter according to a third embodiment of the present invention.

Referring now to FIG. 5, an oil filter 310 in accordance with a third embodiment of the present invention is shown. With the exception of the configuration and placement of the respective mechanical and chemical filter elements 315, 316 and related components, and unless otherwise specified in this section, the oil filter 310 is substantially identical to the oil filter 10 of the first embodiment, as described hereinabove.

The oil filter 310 in this embodiment generally includes a hollow cylindrical housing 311 which defines a chamber 314 therein, a porous mechanically active filter element 315 within that chamber, and a chemically active filter element 316, made up of a plurality of individual composite particles 318, also retained within the chamber inside the housing and disposed below and before the mechanically active filter element. The particles 318 are selected for size so as to make the best effect of the interstices therebetween. Once again, the flow path through the filter is shown by the arrows in the drawing.

As noted in connection with the first embodiment 10, the individual particles 318 making up the chemically active filter element 316 may be bonded together or otherwise cohesively associated with one another to form a substantially integral, yet highly porous filter element 316 capable of independently supporting itself.

In the embodiment 310 of FIG. 5, the mechanically active filter element 315 is a conventional cylindrical member made of accordion-pleated filter paper. A selectively foraminous cylindrical screen or support frame 317 may, optionally, be provided within the housing 311 to supportively hold the mechanically active filter element 315 therein. Also in this embodiment, porous annular upper and lower foraminous dividers 320, 322, respectively, may be placed above and/or below the chemically active filter element 316 to retain the particles 318 of the chemically active filter element therebetween. The dividers 320 or 322 may be selectively foraminous solid plates or may be mesh screens. The upper divider 320 is constructed and arranged to pass oil only to the outside surface of the mechanically active filter element 315, so that the oil must be mechanically filtered before exiting the filter 310.

The chemically active filter element 316 is also provided in the shape of a cylinder in this embodiment, and is disposed below the mechanically active filter element 315. In this embodiment 310 the chemically active filter element 316 is located below the mechanical filter element 315, and therefore precedes the mechanical filter element in the flow path, in order to allow chemical modification of acids or other unwanted contaminants which may be present in the oil, with the beneficial additive of the chemically active filter element 316, prior to mechanical filtration. This design ensures that the oil will pass completely through the chemically active filter element before it reaches the mechanically active filter element, and provides more and longer-lasting interaction between the oil and the chemically active filter element than the design of FIG. 4.

Figure 6:
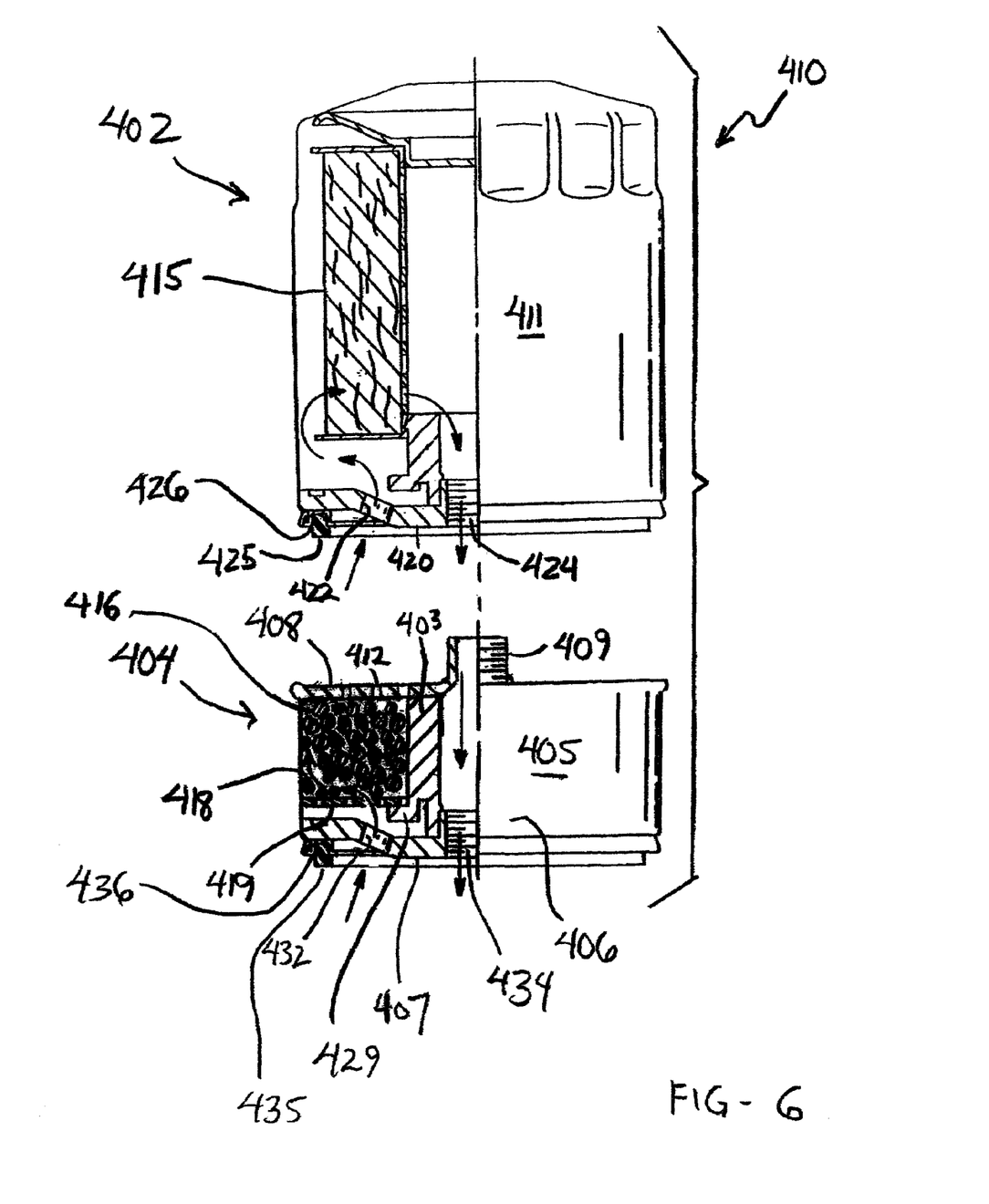
FIG. 6 is an exploded cross-sectional view of a two-part oil filter assembly according to a fourth embodiment of the present invention.

Referring now to FIG. 6, an oil filter assembly 410 in accordance with a fourth embodiment of the present invention is shown. The oil filter assembly 410 in this embodiment includes two primary parts, a conventional oil filter 402 shown on top in the drawing, and a supplemental cartridge 404, shown below the conventional filter.

The conventional oil filter 402 incorporates a mechanically active filter element 415 within a cylindrical housing 411. The conventional oil filter 402 further includes a tapping plate 420, which includes a plurality of inlet ports 422 arranged in a circular pattern as well as a central outlet port 424. The tapping plate 420 is provided as an integral part of the cylindrical housing 411, and an annular sealing member 425 fits engagingly into a groove 426 formed at the bottom surface of the tapping plate. The outlet port 424 has a plurality of female threads formed therein to allow rotatable mounting of the filter 402 on an externally threaded hollow tubular male connector fitting 409 of the supplemental cartridge 404.

The supplemental cartridge 404 is made to rotatably and threadably attach to an externally threaded hollow tubular fitting on an engine block (not shown), and to then have the conventional filter 402 rotatably and threadably fit thereon. The supplemental cartridge 404 includes a cylindrical housing 405 having a side wall 406, a tapping plate 407, sealably connected to the bottom edge of the side wall, and a cover plate 408 sealably connected to the top edge of the side wall.

The cover plate 408 has a plurality of outlet openings 412 formed therein above the chemically active filter member 416 to allow oil to flow outwardly from the supplemental cartridge 404 and then into the inlets 422 of the conventional oil filter 402.

The tapping plate 407 of the supplemental cartridge 404 includes a plurality of inlet ports 432, arranged in a circular pattern, as well as a central outlet port 434. The tapping plate 407 is provided as an integral part of the cylindrical housing 405, and an annular sealing member 435 fits engagingly into a groove 436 formed at the bottom surface of the tapping plate. The outlet port 434 has a plurality of female threads formed therein to allow rotatable mounting of the supplemental cartridge 404 to an externally threaded hollow tubular fitting on an engine block (not shown)

The hollow tubular male connector fitting 409, which is externally threaded, is provided at the center of the cover plate 408, and a cylindrical dividing wall member 403 is centrally disposed within the cartridge housing 405, and forms a fluid seal at the top and bottom surfaces thereof. The cylindrical dividing wall member 403 is preferably made of an oil-tolerant elastomer.

The supplemental cartridge 404 contains a chemically active filter element 416 therein. The chemically active filter element 416 is made up of a plurality of individual composite particles 418, retained within the hollow space inside the cartridge housing 405 and disposed radially outside of the cylindrical dividing wall member 403.

As noted in connection with the first embodiment 10, the individual particles 418 making up the chemically active filter element 416 may be bonded together or otherwise cohesively associated with one another to form a substantially integral, yet highly porous filter element capable of independently supporting itself.

Also in this embodiment, a porous, annular lower mesh screen 419 may be placed below the chemically active filter element 416 to retain the particles 418 of the chemically active filter element thereabove. Where used, the mesh screen 419 may rest on a transverse horizontal flange 429, which is an integral part of the cylindrical dividing wall member 403.

When the conventional oil filter 402 is attached to the supplemental cartridge 404, the total assembly 410 functions in a manner similar to the oil filter 310 of FIG. 5.

The chemically active filter element 416 is also provided in the shape of a cylinder in this embodiment, and when the entire assembly 410 is considered as a whole, the chemically active filter element is disposed below the mechanically active filter element 415 of the conventional oil filter 402, and therefore precedes the mechanical filter element in the flow path, in order to allow chemical modification of acids or other unwanted contaminants which may be present in the oil, with the beneficial additive of the chemically active filter element 416, prior to mechanical filtration. This design ensures that the oil will pass completely through the chemically active filter element 416 before it reaches the mechanically active filter element 415, and provides more and longer-lasting interaction between the oil and the chemically active filter element than the design of FIG. 4.

Optionally, as shown in FIG. 7, the supplemental cartridge 404 may include a pair of hollow tubes 437, 438 attached to the side wall 406 thereof, which communicate with the interior of the cartridge housing 405. Where used, these tubes 427, 438 are provided to allow connection of the supplemental cartridge to a heat exchanger 440 to allow cooling of the oil which passes therethrough.

Although the present invention has been described herein with respect to a preferred embodiment thereof, the foregoing description is intended to be illustrative, and not restrictive. Those skilled in the art will realize that many modifications of the preferred embodiment could be made which would be operable. All such modifications, which are within the scope of the claims, are intended to be within the scope and spirit of the present invention.

Having, thus, described the invention, what is claimed is:

1. An oil filter, comprising:
    a hollow housing having an inlet and an outlet and defining a chamber therein with a flow path between the inlet and outlet;
    a mechanically active filter member disposed inside the housing in the flow path; and
    a chemically active filter member disposed inside the housing in the flow path;
    wherein the chemically active filter member comprises a plurality of particles having interstitial spaces therebetween, said particles having an average diameter of from 0.1 to 6 millimeters and being retained in said oil filter, the particles comprising a beneficial additive to be released into engine oil as said engine oil circulates through the interstitial spaces and wherein the particles further comprise a polymeric binder selected from the group consisting of polyamides, polyimides, polyesters, polyolefins, polysulfones, and mixtures thereof, and the particles are a product of a process comprising the steps of: providing the polymeric binder in a finely divided form; mixing the polymeric binder with the additive in a liquid solvent; forming the mixture of the binder and additive into particles; and removing the solvent from the particles by evaporation.

2. The oil filter of claim 1, wherein the beneficial additive comprises a basic salt that is at least one of the group consisting of calcium carbonate, potassium carbonate, potassium bicarbonate, aluminum dihydroxy sodium carbonate, magnesium oxide, magnesium carbonate, zinc oxide, sodium bicarbonate, sodium hydroxide, calcium hydroxide, potassium hydroxide, and mixtures thereof.

3. The oil filter of claim 1, wherein the mechanically active filter element is substantially cylindrical in shape, and wherein the chemically active filter element is also substantially cylindrical in shape and is disposed radially and coaxially inside of said mechanically active filter element.

4. The oil filter of claim 1, wherein the particles of the chemically active filter member are connected together to form a substantially integral permeable member.

5. The oil filter of claim 1 wherein the beneficial additive comprises an antioxidant that is at least one of the group consisting of imidazoline-phosphonate salts, substituted triazoles, sulfrized carboxylates, phenolic compounds, arylamino compounds, substituted thiazoles, substituted thiadiazoles, phosphosulfurized olefins, zinc dithiophosphates, and zinc dialkyldithiophosphates, aromatic sulfides, aromatic polysulfies, alkyl sulfides, alkyl polysulfides, sulfurized olefins, sulfurized carboxylic acid esters, sulfurized ester-olefins, and mixtures thereof.

6. An oil filter, comprising:
    a hollow housing having a tapping plate for placement proximate an engine surface, said tapping plate having an outlet aperture formed therethrough and an inlet aperture formed therethrough and spaced apart from said outlet aperture;
    a mechanically active filter element disposed within said housing spaced away from said tapping plate;
    a substantially cylindrical dividing wall member disposed within said housing adjacent said tapping plate;
    said dividing wall member defining an inlet flow channel on the outside thereof within the housing and in fluid communication with said inlet aperture of said tapping plate;
    said dividing wall member further defining an outlet flow channel therein in fluid communication with said outlet aperture of said tapping plate; and
    a chemically active filter member disposed within said inlet flow channel of said housing between said tapping plate and said mechanical filter element,
    said chemically active filter member comprising a plurality of particles retained in said oil having a diameter in a range of 0.10 to 6 mm, said particles consisting essentially of a beneficial additive to interact with engine oil as said engine oil circulates through the filter and a polymeric binder, said beneficial additive consisting essentially of an antioxidant, a basic salt, or a mixture of a basic salt and an antioxidant, said antioxidant being selected from the group consisting of imidazoline-phosphonate salts, substituted triazoles, sulfurized carboxylates, phenolic compounds, arylamino compounds, substituted thiazoles, substituted thiadiazoles; phosphosulfurized olefins, zinc dithiophosphates, and zinc dialkyldithiophosphates, aromatic sulfides, aromatic polysulfides, alkyl sulfides, alkyl polysulfides, sulfurized olefins, sulfurized carboxylic acid esters, sulfurized ester-olefins, and mixtures thereof and wherein said polymeric binder selected from the group consisting of polyamides, polyimides, polyesters, polyolefins, polysulfones, and mixtures thereof, and the particles are a product of a process comprising the steps of: providing the polymeric binder in a finely divided form; mixing the polymeric binder with the additive in a liquid solvent; forming the mixture of the binder and additive into particles; and removing the solvent from the particles by evaporation.

7. The oil filter of claim 6, further comprising a foraminous divider disposed between the chemically active filter element and the mechanically active filter element.

8. The oil filter of claim 6, wherein the basic salt selected from the group consisting of calcium carbonate, potassium carbonate, potassium bicarbonate, aluminum dihydroxy sodium carbonate, magnesium oxide, magnesium carbonate, zinc oxide, sodium bicarbonate, sodium hydroxide, potassium hydroxide, calcium hydroxide, and mixtures thereof.

9. A supplemental cartridge for use in conjunction with an oil filter, said supplemental cartridge comprising:
a hollow housing, comprising:
a tapping plate for placement proximate an engine surface, said tapping plate having an outlet aperture formed substantially centrally therethrough and an inlet aperture formed therethrough and spaced apart from said outlet aperture;
a cap opposite said tapping plate for placement proximate an oil filter, said cap having an inlet aperture formed substantially centrally therethrough and an outlet aperture formed therethrough and spaced apart from said inlet aperture;
an outer wall connecting said cap and said tapping plate;
a substantially cylindrical dividing wall member disposed within said housing and separating said housing interior into an inlet flow channel in fluid communication with said inlet aperture of said tapping plate, and an outlet flow channel in fluid communication with said outlet aperture of said tapping plate; and
a chemically active filter member disposed within said inlet flow channel of said housing, said chemically active filter member comprising a plurality of particles having a diameter in a range of 0.10 to 6 mm, said particles consisting essentially of a beneficial additive and a polymeric binder, said beneficial additive consisting essentially of at least one of an antioxidant, or a mixture of a basic salt and an antioxidant and wherein said polymeric binder is selected from the group consisting of polyamides, polyimides, polyesters, polyolefins, polysulfones, and mixtures thereof, and the particles are a product of a process comprising the steps of: providing the polymeric binder in a finely divided form; mixing the polymeric binder with the additive in a liquid solvent; forming the mixture of the binder and additive into particles; and removing the solvent from the particles by evaporation.

10. The supplemental cartridge of claim 9, wherein the basic salt is selected from the group consisting of calcium carbonate, potassium carbonate, potassium bicarbonate, aluminum dihydroxy sodium carbonate, magnesium oxide, magnesium carbonate, zinc oxide, sodium bicarbonate, sodium hydroxide, potassium hydroxide, calcium hydroxide, and mixtures thereof.

11. The supplemental cartridge of claim 9, further comprising:
an auxiliary inlet tube attached to said outer wall of said housing and being in fluid communication with said inlet flow channel thereof; and
an auxiliary outlet tube attached to said outer wall of said housing and being in fluid communication with said interior thereof.

12. An oil filter, comprising:
a housing defining an inlet fluid opening and an outlet fluid opening, said inlet fluid opening and said outlet opening defining a fluid path through said housing;
a mechanically active filter member disposed inside the housing, said mechanically active filter being disposed in said fluid path such that fluid flowing through said fluid path must pass through said mechanically active filter member; and
a chemically active filter member disposed inside the housing, said chemically active filter being disposed in said fluid path such that fluid flowing through said fluid path must pass through said chemically active filter member;
wherein the chemically active filter member comprises a plurality of particles retained in said oil filter, said particles comprising from 90 to 97% by weight of a beneficial additive to be released into engine oil as said engine oil circulates through the oil filter, based on the total solid weight of the particles, wherein the beneficial additive comprises at least one of an antioxidant, an anti-wear agent, a basic salt, or a mixture thereof and wherein the particles further comprise a polymeric binder selected from the group consisting of polyamides, polyimides, polyesters, polyolefins, polysulfones, and mixtures thereof, and the particles are a product of a process comprising the steps of: providing the polymeric binder in a finely divided form; mixing the polymeric binder with the additive in a liquid solvent; forming the mixture of the binder and additive into particles; and removing the solvent from the particles by evaporation.

* * * * *